(12) United States Patent
Takahashi

(10) Patent No.: US 11,949,292 B2
(45) Date of Patent: Apr. 2, 2024

(54) ROTOR AND METHOD FOR MANUFACTURING ROTOR

(71) Applicant: DENSO CORPORATION, Kariya (JP)

(72) Inventor: Yuki Takahashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 422 days.

(21) Appl. No.: 17/208,484

(22) Filed: Mar. 22, 2021

(65) Prior Publication Data

US 2021/0211006 A1 Jul. 8, 2021

Related U.S. Application Data

(63) Continuation of application No. PCT/JP2019/034626, filed on Sep. 3, 2019.

(30) Foreign Application Priority Data

Oct. 30, 2018 (JP) .................. 2018-204071

(51) Int. Cl.
| | |
|---|---|
| H02K 1/27 | (2022.01) |
| H02K 1/276 | (2022.01) |
| H02K 1/278 | (2022.01) |
| H02K 1/28 | (2006.01) |
| H02K 1/30 | (2006.01) |
| H02K 15/03 | (2006.01) |

(52) U.S. Cl.
CPC .......... H02K 1/278 (2013.01); H02K 1/2773 (2013.01); H02K 1/30 (2013.01); H02K 15/03 (2013.01)

(58) Field of Classification Search
CPC ........ H02K 1/278; H02K 1/2773; H02K 1/30; H02K 15/03; H02K 1/2766
See application file for complete search history.

(56) References Cited

U.S. PATENT DOCUMENTS

| | | | |
|---|---|---|---|
| 2004/0178693 A1* | 9/2004 | Burgbacher | H02K 5/15 310/156.53 |
| 2008/0007131 A1 | 1/2008 | Cai et al. | |
| 2014/0125182 A1 | 5/2014 | Takahashi | |
| 2014/0125184 A1 | 5/2014 | Takahashi | |
| 2019/0027982 A1 | 1/2019 | Tsuchida et al. | |
| 2021/0305859 A1* | 9/2021 | Furuta | H02K 1/27 |

FOREIGN PATENT DOCUMENTS

| | | |
|---|---|---|
| JP | 2013-110827 A | 6/2013 |
| JP | 2014-36486 A | 2/2014 |
| WO | 2018/056318 A1 | 3/2018 |

* cited by examiner

*Primary Examiner* — Thomas Truong
(74) *Attorney, Agent, or Firm* — Oliff PLC

(57) ABSTRACT

A rotor including a magnet and a rotor core. The magnet includes a pair of shoulders and a housing hole configured to house the magnet such that the pair of shoulders are arranged in a circumferential direction. The rotor core includes an inner core, a pair of supporters, and a covering portion. The inner core is located radially inward of the housing hole. The pair of supporters is located radially outward of the inner core and arranged in the circumferential direction through the housing hole. The covering portion connects between the pair of supporters. The supporters are configured to support the magnet by holding the pair of shoulders. The covering portion is configured to cover the magnet from radially outside of the magnet and has a thin portion connected to at least the pair of supporters.

9 Claims, 10 Drawing Sheets

US 11,949,292 B2

ROTOR AND METHOD FOR MANUFACTURING ROTOR

CROSS REFERENCE TO RELATED APPLICATION

The present application is a continuation application of International Patent Application No. PCT/JP2019/034626 filed on Sep. 3, 2019, which designated the U.S. and claims the benefit of priority from Japanese Patent Application No. 2018-204071 filed on Oct. 30, 2018. The entire disclosures of all of the above applications are incorporated herein by reference.

TECHNICAL FIELD

The present disclosure relates to a rotor and a method for manufacturing the rotor.

BACKGROUND

A rotor of a rotating electric machine includes multiple magnets arranged in a circumferential direction and a rotor core housing the magnets. In the rotor, multiple magnetic poles arranged in the circumferential direction are formed by the magnets.

SUMMARY

A rotor includes a magnet including a pair of shoulders and a rotor core defining a housing hole configured to house the magnet such that the pair of shoulders are arranged in a circumferential direction. The rotor core includes an inner core, a pair of supporters, and a covering portion. The inner core is located radially inward of the housing hole. The pair of supporters are located radially outward of the inner core and arranged in the circumferential direction with the housing hole defined between the pair of supporters. The pair of supporters are configured to support the magnet by holding the pair of shoulders of the magnet from radially outside of the pair of shoulders. The covering portion is configured to connect between the pair of supporters and cover the magnet from radially outside of the magnet. The covering portion includes a thin portion that is connected to at least the pair of supporters. The thin portion of the covering portion is thinner than each of the pair of supporters.

A method for manufacturing includes preparing a magnet including a pair of shoulders and a rotor core defining a housing hole configured to house the magnet. The rotor core includes an inner core, a pair of supporters, and a covering portion. The rotor core is located radially inward of the housing hole. The pair of supporters are located radially outward of the inner core and arranged in the circumferential direction with the housing hole defined between the pair of supporters. The covering portion is configured to connect between the pair of supporters and cover the magnet from radially outside of the magnet. The method further includes housing the magnet in the housing hole such that the pair of shoulders are arranged in the circumferential direction and preparing a mold device including a cavity and a gate connected to the cavity. The cavity is configured to mold a resin disposed in a housing gap of the housing hole that is defined between the magnet and the rotor core. The method further includes attaching the rotor core including the magnet housed in the housing hole to the cavity such that the gate is in communication with, in an axial direction of the rotor core, an inner gap of the housing gap that is defined between the magnet and the inner core and supplying a molten resin into the inner gap through the gate. After the molten resin is solidified, the rotor core is removed from the mold device.

DESCRIPTION OF EMBODIMENTS

Figure 1:
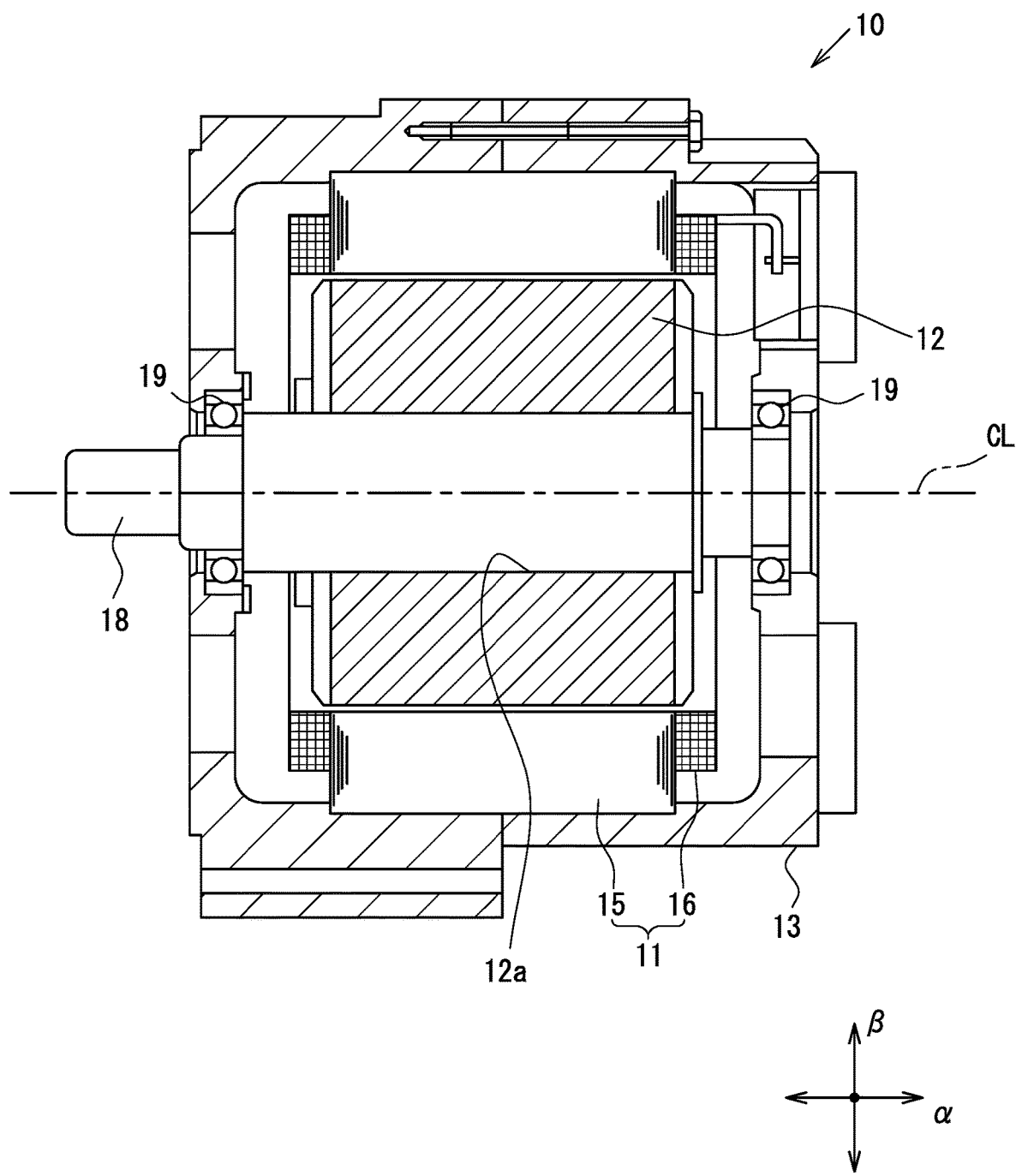
FIG. 1 is a vertical cross-sectional view of a rotating electric machine of a first embodiment.

To begin with, examples of relevant techniques will be described.

A rotor of a rotating electric machine includes multiple magnets arranged in a circumferential direction and a rotor core housing the magnets. In the rotor, multiple magnetic poles arranged in the circumferential direction are formed by the magnets. The rotor includes q-axis core portions, core portions near a stator, and bridge portions. The q-axis core portions are disposed between adjacent ones of the magnet poles arranged in the circumferential direction. The core portions near the stator are disposed radially outward of the magnets. The bridge portions connect between each of the q-axis core portions and each of the core portions near the stator. The bridge portions have thicknesses less than those of the core portions near the stator and are located between the magnets and the q-axis core portions in the circumferential direction, so that an amount of useful flux can be suppressed from reducing.

However, in this case, when the rotor rotates in the rotating electric machine, stress from the magnets due to centrifugal force is concentrated on the bridge portions. Thus, abnormalities such as deformation of the bridge portions and the magnets may occur. Therefore, it is considered to increase strength of the bridge portions by increasing thicknesses of the bridge portions. However, in this way, a magnetic flux easily passes through the bridge portions toward the q-axis core portions and an amount of the useful flux may be reduced.

According to the present disclosure, a rotor can restrict a rotor core and a magnet from deforming and restrict an amount of a useful flux from reducing. In addition, a method for manufacturing the rotor is provided.

The disclosed aspects in this specification adopt different technical solutions from each other in order to achieve their respective objectives. In addition, the reference numerals in parentheses described in the claims indicate a corresponding relationship to the concrete means described in the embodiments, which are exemplary aspects of the present disclosure. That is, the technical scope of the present invention is not limited by the reference numerals.

According to a first aspect, a rotor is provided. The rotor includes a magnet including a pair of shoulders and a rotor core defining a housing hole configured to house the magnet such that the pair of shoulders are arranged in a circumferential direction. The rotor core includes an inner core, a pair of supporters, and a covering portion. The inner core is located radially inward of the housing hole. The pair of supporters are located radially outward of the inner core and arranged in the circumferential direction with the housing hole defined between the pair of supporters. The pair of supporters are configured to support the magnet by holding the pair of shoulders of the magnet from radially outside of the pair of shoulders. The covering portion is configured to connect between the pair of supporters and cover the magnet from radially outside of the magnet. The covering portion includes a thin portion that is connected to at least the pair of supporters. The thin portion of the covering portion is thinner than each of the pair of supporters.

According to the first aspect, the pair of supporters hold the pair of shoulders of the magnet from radially outside of the magnet. In this configuration, when the rotor rotates, the pair of supporters restrict the magnet from moving radially outward due to a centrifugal force. Thus, the pair of supporters can restrict a load of the magnet from being applied to the covering portion due to the centrifugal force and suppress abnormalities such as deformation of the covering portion. Further, in the rotor, since the covering portion covers the magnet from radially outside of the magnet, the covering portion can restrict the magnet from deforming, due to the centrifugal force, such that a center portion of the magnet protrudes radially outward.

Further, the covering portion has a thin portion connected to at least the pair of supporters. Thus, a magnetic flux is less likely to pass through the thin portion in a direction to cause a polarity opposite to the polarity of the magnet. That is, the thin portion makes it difficult to generate a short circuit of the magnetic flux through the covering portion. Therefore, even if the thicknesses of the pair of supporters are sufficiently increased so that the pair of supporters can stand the centrifugal force, it is possible to prevent the magnetic flux from passing through the pair of supporters. Thus, an amount of the useful flux can be restricted from reducing. Further, since the magnet is supported by the pair of supporters, the thin portion needs to have strength high enough to regulate the deformation of the magnet, so that the thin portion can be thin enough to restrict the amount of the useful flux from decreasing.

As described above, it is possible to suppress both the occurrence of abnormalities such as deformation of the rotor core and the magnet and the reduction of the amount of useful flux.

According to a second aspect, a method for manufacturing a rotor is provided. The method includes preparing a magnet including a pair of shoulders and a rotor core defining a housing hole configured to house the magnet. The rotor core includes an inner core, a pair of supporters, and a covering portion. The rotor core is located radially inward of the housing hole. The pair of supporters are located radially outward of the inner core and arranged in the circumferential direction with the housing hole defined between the pair of supporters. The covering portion is configured to connect between the pair of supporters and cover the magnet from radially outside of the magnet. The method further includes housing the magnet in the housing hole such that the pair of shoulders are arranged in the circumferential direction and preparing a mold device including a cavity and a gate connected to the cavity. The cavity is configured to mold a resin disposed in a housing gap of the housing hole that is defined between the magnet and the rotor core. The method further includes attaching the rotor core including the magnet housed in the housing hole to the cavity such that the gate is in communication with, in an axial direction of the rotor core, an inner gap of the housing gap that is defined between the magnet and the inner core and supplying a molten resin into the inner gap through the gate. After the molten resin is solidified, the rotor core is removed from the mold device.

According to the second aspect, in the housing hole of the rotor core, the molten resin is supplied into the inner gap defined between the magnet and the inner core in the housing hole through the gate of the mold device. Therefore, by simply supplying the molten resin into the housing hole, the magnet is moved in the housing hole radially outward away from the inner core and the pair of the shoulders of the magnet are caught by the pair of supporters. Therefore, the same advantages as those of the first aspect can be obtained.

Hereinafter, embodiments for implementing the present disclosure will be described referring to drawings. In each embodiment, portions corresponding to the elements described in the preceding embodiments are denoted by the same reference numerals, and redundant explanation may be omitted. When only a part of a configuration is described in an embodiment, another preceding embodiment may be applied to the other parts of the configuration. Besides combinations of parts which are specifically and clearly described as feasible in each of the embodiments, combinations of parts of the embodiments which are not clearly described as feasible are possible, if the parts can be combined without any special trouble.

First Embodiment

A rotating electric machine 10 shown in FIG. 1 is a three-phase AC type motor generator. The rotating electric machine 10 is a vehicular motor and mounted in a vehicle such as an electric vehicle or a hybrid vehicle. The rotating electric machine 10 is used as a generator or an electric motor in the vehicle. In addition to being used for a vehicle, the rotating electric machine 10 may be used for industrial purposes, home appliances, office automation equipment, game machines, and the like.

Figure 2:
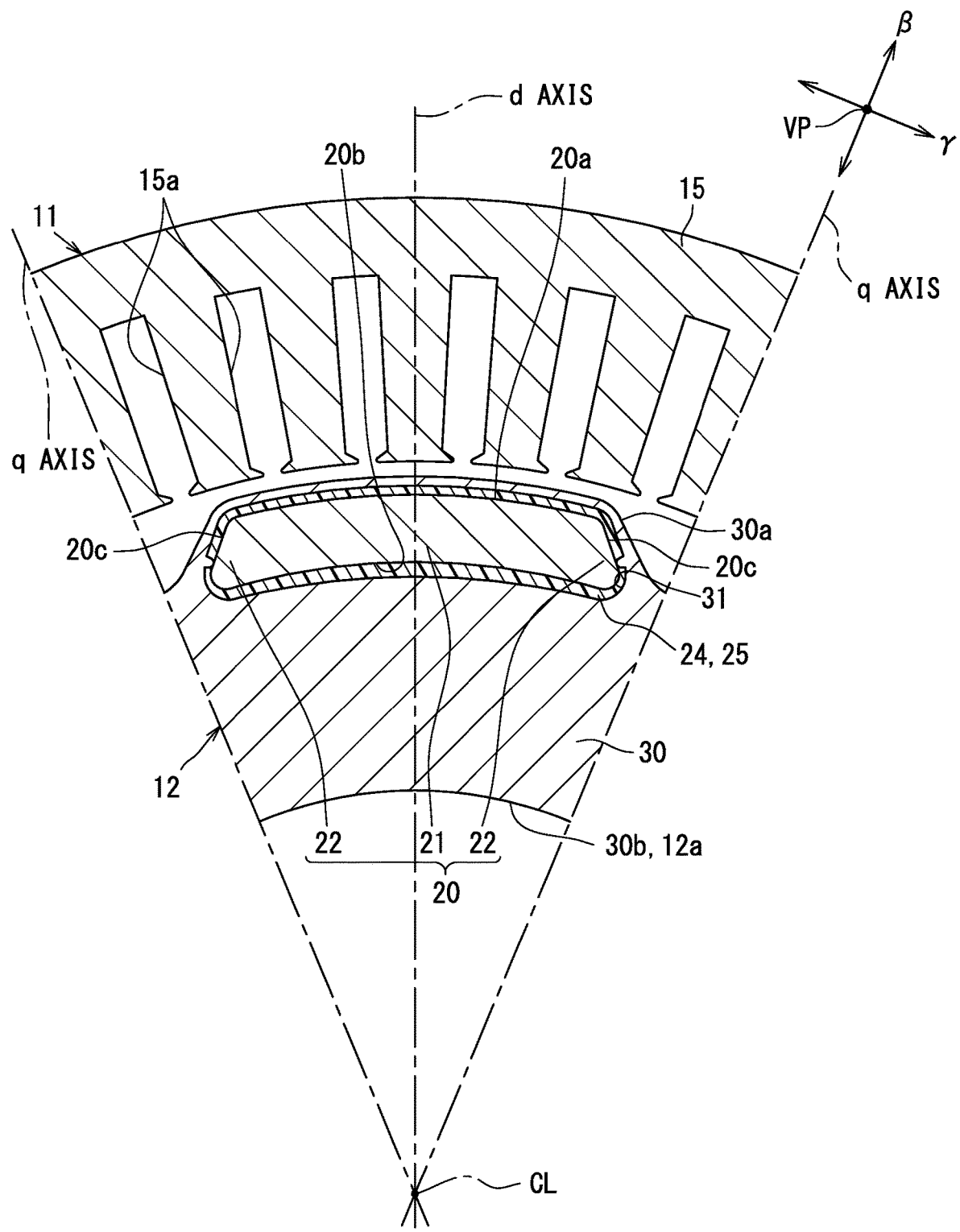
FIG. 2 is a partial cross-sectional view of the rotating electric machine in a direction perpendicular to an axial direction.

The rotating electric machine 10 has an annular stator 11, a rotor 12 located inside the stator 11, and a housing 13 housing the stator 11 and the rotor 12. In this embodiment, the rotor 12 rotates around a center line CL of the rotor 12 as an axis and an extending direction of the center line CL is defined as an axial direction α. In this case, a radial direction β and a circumferential direction γ of the rotor 12 are both perpendicular to the axial direction α. In this embodiment, when a straight virtual line that passes through the center line CL and extends in the radial direction β is defined, the axial direction α, the radial direction β, and the circumferential direction γ are perpendicular to each other at a virtual point VP on the virtual line. In FIG. 2, a point on a q-axis, which will be described later, is shown as the virtual point VP.

The stator 11 is fixed to the housing 13 and an outer circumferential surface of the stator 11 faces an inner circumferential surface of the housing 13. The stator 11 includes an annular stator core 15 and a stator winding 16 wound around the stator core 15. The stator core 15 is formed into a tubular shape as a whole by stacking multiple annular electromagnetic steel plates in the axial direction α. The stator winding 16 include multiple conductor segments and the conductor segments are connected to each other while attached to the stator core 15. Each of the conductor segments includes an elongated conductor and an insulating coating configured to cover an outer surface of the conductor. The stator core 15 defines multiple slots 15a (see FIG. 2) passing through the stator core 15 in the axial direction α and the conductor segments are inserted into the slots 15a. In FIG. 2, illustrations of the stator winding 16 is omitted.

The rotor 12 defines a shaft hole 12a extending along the center line CL. The rotor 12 is an annular member extending along the center line CL and the shaft hole 12a is defined by an inner circumferential surface of the rotor 12. The rotor 12 has an outer circumferential surface located radially inward of the stator 11. The outer circumferential surface of the rotor 12 is located away from the inner circumferential surface of the stator 11. In the rotor 12, an inner side of the rotor 12 in the radial direction β is defined as a radially inner side and an outer side of the rotor 12 in the radial direction β is defined as a radially outer side.

The rotating electric machine 10 includes a rotary shaft 18 fixed to the rotor 12 and bearings 19 that rotatably support the rotary shaft 18. The rotary shaft 18 includes a center line that coincides with the center line CL of the rotor 12 and rotates together with the rotor 12. The rotary shaft 18 is a long member extending from the rotor 12 in the axial direction α. The rotary shaft 18 is fixed to the rotor 12 while the rotary shaft 18 is inserted into the shaft hole 12a. The bearings 19 are fixed to the housing 13. The bearings 19 are two located away from each other in the axial direction α.

As shown in FIG. 2, the rotor 12 includes magnets 20 and a rotor core 30. The rotor 12 is an interior magnet type rotor in which magnets 20 are embedded in the rotor core 30. The magnets 20 are permanent magnets arranged in the circumferential direction γ. In the rotor 12, these magnets 20 form multiple magnetic poles having alternately different polarities in the circumferential direction γ. In this embodiment, eight magnetic poles are formed in the rotor 12. In the rotor 12, a d-axis passing through a center of each of the magnetic poles and a q-axis passing through a midpoint of the adjacent magnetic poles are defined. Both the d-axis and the q-axis extend straight in the radial direction β through the center line CL. In each of the magnetic poles, an amount of the magnetic flux and the magnetic flux density of one of the N pole and the S pole are the greatest at the d-axis and becomes smaller in a direction away from the d axis in the circumferential direction γ. The amount of the magnetic flux and the magnetic flux density are almost zero at the q-axis.

Figure 3:
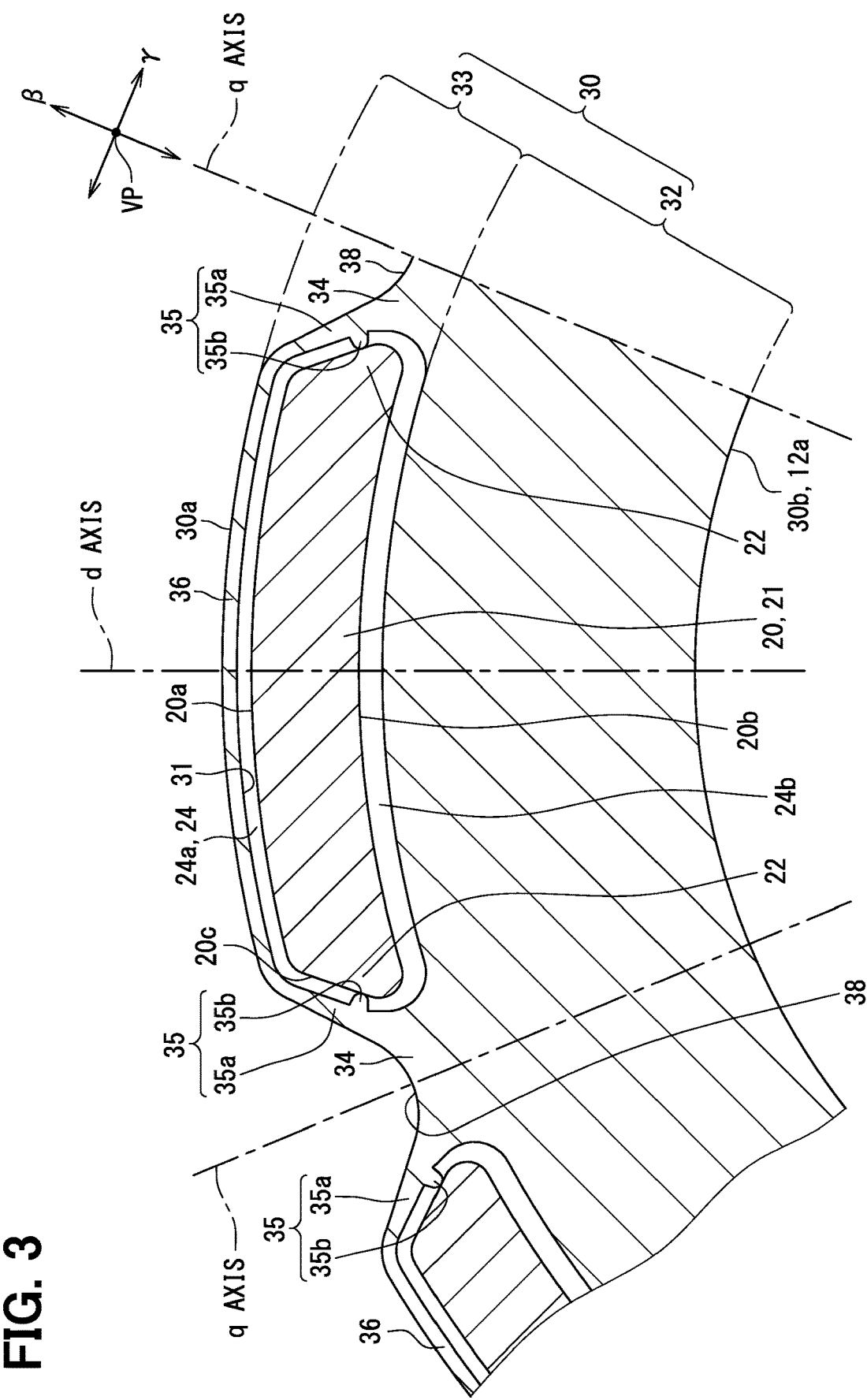
FIG. 3 is an enlarged view of a rotor around a magnet in FIG. 2.

As shown in FIGS. 2 and 3, each of the magnets 20 extends in a columnar shape in the axial direction α. In the rotor 12, the magnets 20 are embedded in arc shapes. Specifically, the cross-sectional shape of each of the magnets 20 taken along a surface extending in the directions β and γ that are perpendicular to the axial direction α has a flat shape extending in the circumferential direction γ. Each of the magnets 20 has a thickness dimension in the radial direction β that is less than a width dimension of the each of the magnets 20 in the circumferential direction γ and a central portion of the magnet 20 in the circumferential direction γ is curved to protrude radially outward. Each of the magnets 20 includes a base portion 21 having the central portion in the circumferential direction γ and a pair of shoulders 22 located on both sides of the base portion 21 in the circumferential direction γ. Each of the magnets 20 has an outer surface 20a facing radially outward, an inner surface 20b facing radially inward, and a pair of side surfaces 20c connecting between the outer surface 20a and the inner surface 20b. The base portion 21 includes at least the outer surface 20a and the inner surface 20b, and the shoulders 22 include at least the side surfaces 20c. At least a portion of the side surfaces 20c of the shoulders 22 is tilted relative to the radial direction β to face radially outward.

The each of the magnets 20 is arranged between adjacent ones of the q-axes in the circumferential direction γ and extends through the d axis in the circumferential direction γ. The center of the each of the magnets 20 in the circumferential direction γ is located on the d-axis. The base portion 21 of the magnet 20 intersects the d axis in the circumferential direction γ and the pair of shoulders 22 of the magnet 20 are located away from the q-axes toward the d-axis. The pair of shoulders 22 are located closer to the q-axes in the circumferential direction γ than the d-axis. The magnetizing direction of each of the magnets 20 is a direction in which the d-axis extends. The magnetic fluxes of the magnet 20 extend parallel to each other and extend parallel to the d-axis. The magnetizing direction of the magnet 20 may be the radial direction β. In this case, the magnetic fluxes in the magnet 20 are not parallel to each other.

The rotor core 30 is formed into a cylindrical shape as a whole by stacking a large number of electromagnetic steel sheets in the axial direction α. The rotor core 30 has an outer circumferential surface 30a and an inner circumferential surface 30b. The outer circumferential surface 30a and the inner circumferential surface 30b form an outer frame of the rotor 12. The outer circumferential surface 30a forms the outer circumferential surface of the rotor 12 and the inner circumferential surface 30b forms the inner circumferential surface of the rotor 12.

Figure 4:
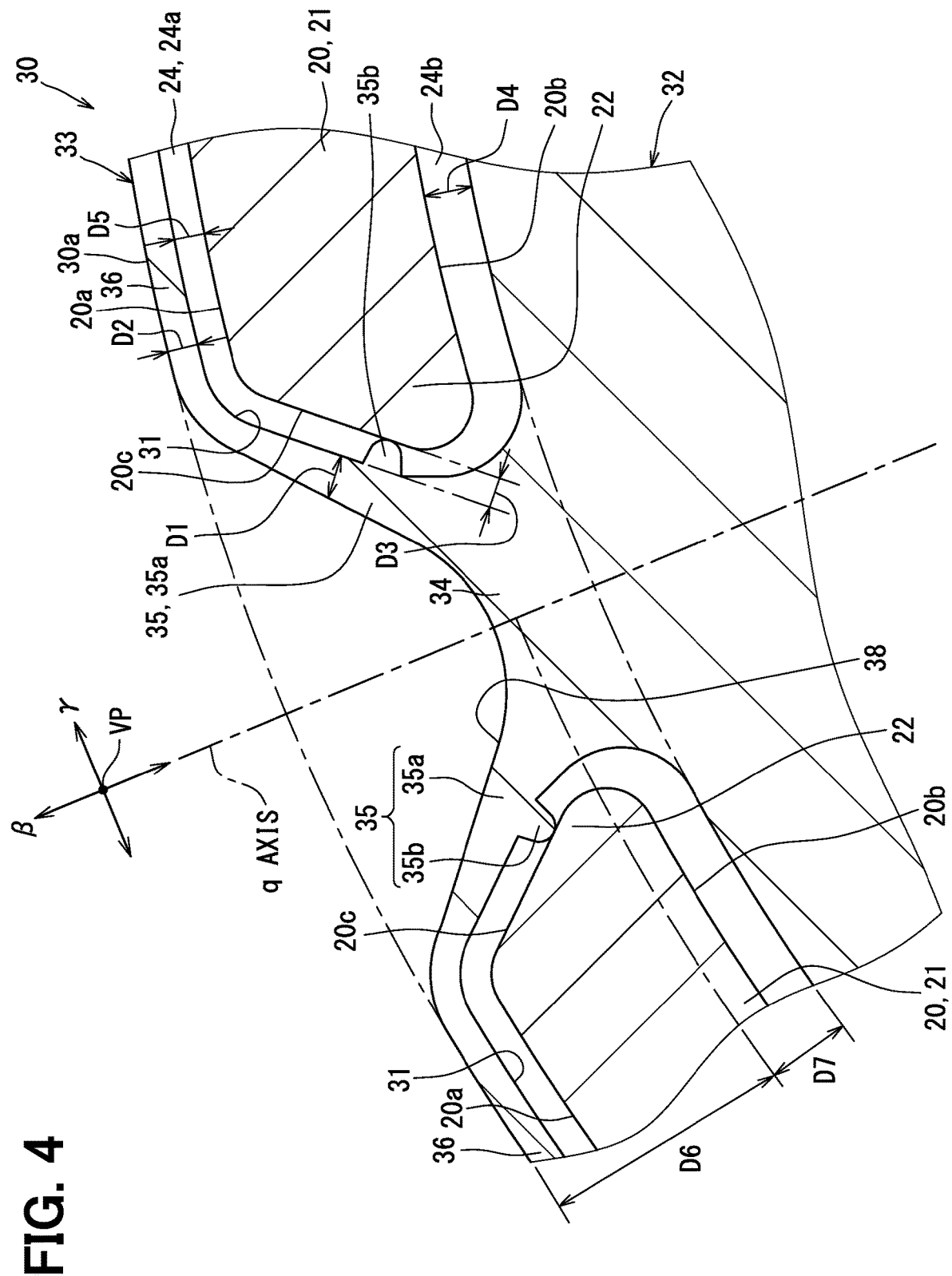
FIG. 4 is an enlarged view of the rotor around a q-axis recessed portion in FIG. 3.

The rotor core 30 defines housing holes 31 in which the magnets 20 are housed. That is, the rotor core 30 corresponds to a housing hole defining portion that defines the housing holes 31. The housing holes 31 are through holes that pass through the rotor core 30 in the axial direction α. The housing holes 31 are arranged in the circumferential direction γ. One magnet 20 is housed in one housing hole 31. Each of the housing holes 31 has a cross-sectional shape taken along a surface extending in the directions β and γ that are perpendicular to the axial direction α that is substantially the same as the cross-sectional shape of each of the magnet 20. The housing hole 31 is larger than the magnet 20. There is a gap in the housing hole 31 between the rotor core 30 and the magnet 20. When this gap is referred to as a housing gap 24, the housing gap 24 is filled with a filling portion 25. The filling portion 25 is formed by solidifying a filling material such as a resin material. In FIGS. 3 and 4, the illustration of the filling portion 25 is omitted.

As shown in FIGS. 2 and 3, the rotor core 30 includes an inner core 32 and an outer core 33. The inner core 32 and the outer core 33 extend in the axial direction α and form both end surfaces of the rotor core 30. The inner core 32 is located radially inward of the housing holes 31. The inner core 32 has a cylindrical shape and forms the inner circumferential surface 30b of the rotor core 30. The outer core 33 is located radially outward of the inner core 32. The outer core 33 has a cylindrical shape as a whole and forms the outer circumferential surface 30a of the rotor core 30. The inner core 32 and the outer core 33 are arranged in the radial direction β. The housing holes 31 are defined between the inner core 32 and the outer core 33 in the radial direction β. Both the inner core 32 and the outer core 33 define housing holes 31.

The outer core 33 includes q-axis crossing portions 34, supporters 35, and covering portions 36. The q-axis crossing portions 34, the supporters 35, and the covering portions 36 extend in the axial direction α and form both end surfaces of the outer core 33. Each of the q-axis crossing portions 34 is located between adjacent ones of the housing holes 31 in the circumferential direction γ and pass through the q-axis in the circumferential direction γ. The q-axis crossing portions 34 extend radially outward from the inner core 32.

Two of the supporters 35 are provided for one housing hole 31. The two supporters 35 are arranged on both sides of the housing hole 31 in the circumferential direction γ. The pair of supporters 35 support the magnet 20 by holding the pair of shoulders 22 of the magnet 20 from radially outsides of the pair of shoulders 22. The supporters 35 can restrict the magnets 20 from moving radially outward against centrifugal force generated at the magnets 20 when the rotor 12 rotates.

Adjacent ones of the supporters 35 in the circumferential direction γ without through the magnet 20 are provided respectively for different housing holes 31. The q-axis crossing portion 34 connects between the adjacent ones of the supporters 35 without through the magnet 20 and corresponds to a connecting portion. These supporters 35 are adjacent to each other in the circumferential direction γ with the q-axis in between and extend from the q-axis crossing portion 34.

Each of the supporters 35 has an extending portion 35a and a protrusion 35b. The extending portion 35a and the protrusion 35b extend in the axial direction α and form both end surfaces of the supporter 35. The extending portion 35a extends radially outward from the q-axis crossing portion 34 and in the circumferential direction γ. The extending portion 35a of this embodiment is tilted relative to the q-axis and extends outward in the radial direction away from the q-axis. The protrusion 35b protrudes from the extending portion 35a toward the housing hole 31. Thus, in the supporter 35, the protrusion 35b is more likely to hold the shoulder 22 of the magnet 20 than the extending portion 35a.

In this embodiment, the protrusion 35b has a cross-sectional shape taken along a surface extending in the directions β and γ that are perpendicular to the axial direction α that is a semicircular. Thus, when the magnet 20 is caught by the protrusion 35b, the protrusion 35b is in point contact with one of the shoulders 22 of the magnet 20 in the cross-section taken along a surface perpendicular to the axial direction α. In this case, a contact portion between the protrusion 35b and the magnet 20 extends linearly in the axial direction α. That is, the protrusion 35b and the magnet 20 are in line contact with each other. The cross-sectional shape of the protrusion 35b may be triangular or semi-elliptical.

The covering portion 36 extends in the circumferential direction γ and connects between the pair of supporters 35. The covering portion 36 covers the magnet 20 from radially outside of the magnet 20. The covering portion 36 is thinner than the extending portion 35a. In other words, the extending portion 35a is thicker than the covering portion 36 and corresponds to a thick portion.

As shown in FIG. 4, a thickness dimension D1 of the extending portion 35a in a thickness direction of the extending portion 35a is greater than a thickness dimension D2 of the covering portion 36 in a thickness direction of the covering portion 36. The extending portion 35a becomes thinner gradually in a direction away from the q-axis crossing portion toward the covering portion 36. That is, the thickness dimension D1 of the extending portion 35a gradually decreases toward the covering portion 36. On the other hand, the thickness dimension D2 of the covering portion 36 is uniform in the circumferential direction γ. The entire of the covering portion 36 is thinner than the thinnest portion of the extending portion 35a and corresponds to a thin portion. In this case, the covering portion 36 includes the thin portion. Further, a protrusion dimension D3 in the thickness direction of the protrusion 35b that protrudes from the extending portion 35a is smaller than the thickness dimension D1 of the extending portion 35a.

In the extending portion 35a and the covering portion 36, a center line connecting midpoints between the outer circumferential surface 30a of the rotor core 30 and the housing hole 31 is defined and a direction perpendicular to the center line is defined as a thickness direction. The thickness dimensions D1 and D2 are distances between the outer circumferential surface 30a and the housing hole 31 in the thickness direction of the extending portion 35a and the covering portion 36.

The housing gap 24 includes an outer gap 24a, which is a gap defined between the outer surface 20a of the magnet 20 and the covering portion 36, and an inner gap 24b, which is a gap defined between the inner surface 20b of the magnet 20 and the inner core 32. The inner gap 24b is defined radially inward of the magnet 20 and the outer gap 24a is defined radially outward of the magnet 20. In the radial direction β, a gap dimension D4 of the inner gap 24b is larger than a gap dimension D5 of the outer gap 24a. The magnet 20 is arranged at a position closer to the covering portion 36 than the inner core 32 in the radial direction β. The gap dimension D4 of the inner gap 24b is defined as a gap dimension that is the smallest in the inner gap 24b and the gap dimension D5 of the outer gap 24a is defined as a gap dimension that is the largest in the outer gap 24a.

The rotor core 30 includes q-axis recessed portions 38. The q-axis recessed portions 38 are recessed radially inward from the outer circumferential surface 30a along the q-axis. The q-axis recessed portions 38 do not reach the inner core 32 and are arranged radially outward away from the inner core 32. Portions of the rotor core 30 between the q-axis recessed portions 38 and the inner core 32 correspond to the q-axis crossing portions 34. Each of the q-axis recessed portions 38 has a recessed dimension D6 in the radial direction β that is larger than a thickness dimension D7 of each of the q-axis crossing portions 34. On the other hand, the thickness dimension D7 of the q-axis crossing portion 34 is larger than the thickness dimension D1 of the extending portion 35a. The end of the q-axis recessed portion 38 in the circumferential direction γ, the extending portion 35a, the protrusion 35b, the housing hole 31, and the magnet 20 are arranged in the radial direction β. The thickness dimension D7 of the q-axis crossing portion 34 is defined as a thickness dimension of a portion of the q-axis crossing portion 34 that is the thinnest in the circumferential direction γ.

The smaller the thickness dimension D2 of the covering portion 36, the easier the magnetic flux generated by the magnet 20 pass through the covering portion 36 in the direction parallel to the d-axis and in the radial direction β. In other words, the more thinner the covering portion 36 becomes than the extending portion 35a, the more the magnetic flux travels back and forth between the rotor 12 and the stator 11. Thus, the amount of useful flux is less likely to decrease.

Figure 5:
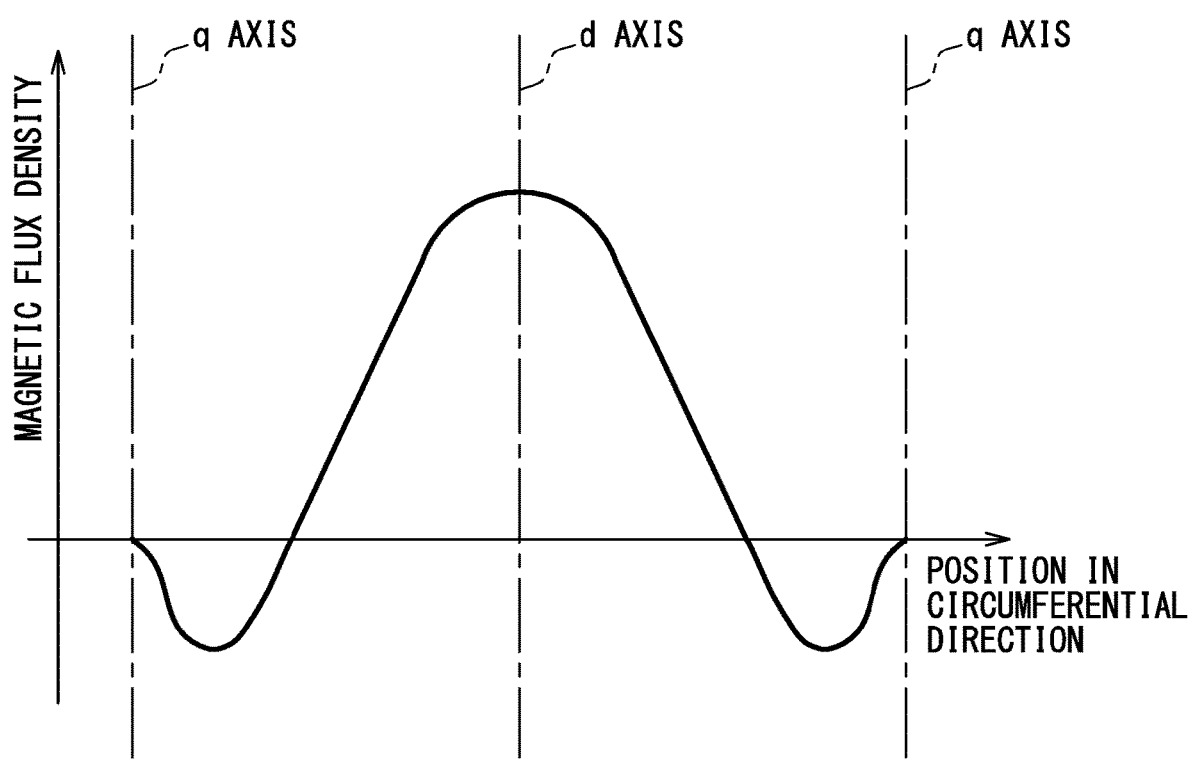
FIG. 5 is a diagram illustrating a relationship between a d-axis, a q-axis, and a magnetic flux.

A strength of the supporter 35 to support the magnet 20 increases as the thickness dimension D1 of the extending portion 35a increases and the protrusion 35b is closer to the q-axis crossing portion 34. Since the extending portion 35a extends from the q-axis crossing portion 34, as the thickness dimension D7 of the q-axis crossing portion 34 increases, it becomes easier to realize a configuration in which the extending portion 35a has a large thickness dimension D1. In contrast, as the thickness dimension D7 of the q-axis crossing portion 34 increases, the magnetic flux that generates a polarity opposite to a polarity at the d axis is more likely to pass through the q-axis crossing portion 34. For example, as shown in FIG. 5, on the outer circumferential surface 30a of the rotor core 30, one of the N pole and the S pole is generated on the d-axis and neither the N pole nor the S pole is generated on the q-axis. In this case, the more the magnetic flux passes through the q-axis crossing portion 34, the more likely it is that the polarity opposite to that at the d-axis will occur at the position between the d-axis and the q-axis. As a result, the effective value of the magnetic flux decreases and the useful flux is likely to decrease.

Contrary, in the present embodiment, the thickness dimension D7 of the q-axis crossing portion 34 is larger than the thickness dimension D1 of the extending portion 35a and the q-axis crossing portion 34 has a certain thickness. Thus, it is less likely to occur that the support strength of the supporters 35 is insufficient. On the other hand, the thickness dimension D7 of the q-axis crossing portion 34 is less than the recessed dimension D6 of the q-axis recessed portion 38 such that the magnetic flux that causes the polarity opposite to that at the d-axis is difficult to pass through the q-axis crossing portion 34. Therefore, an amount of useful flux is restricted from decreasing.

Next, a method for manufacturing the rotor 12 will be described with reference to FIGS. 6 and 7. The method for manufacturing the rotor 12 includes a method for manufacturing the filling portion 25 to generate the filling portion 25 using an injection molding apparatus 50.

Figure 6:
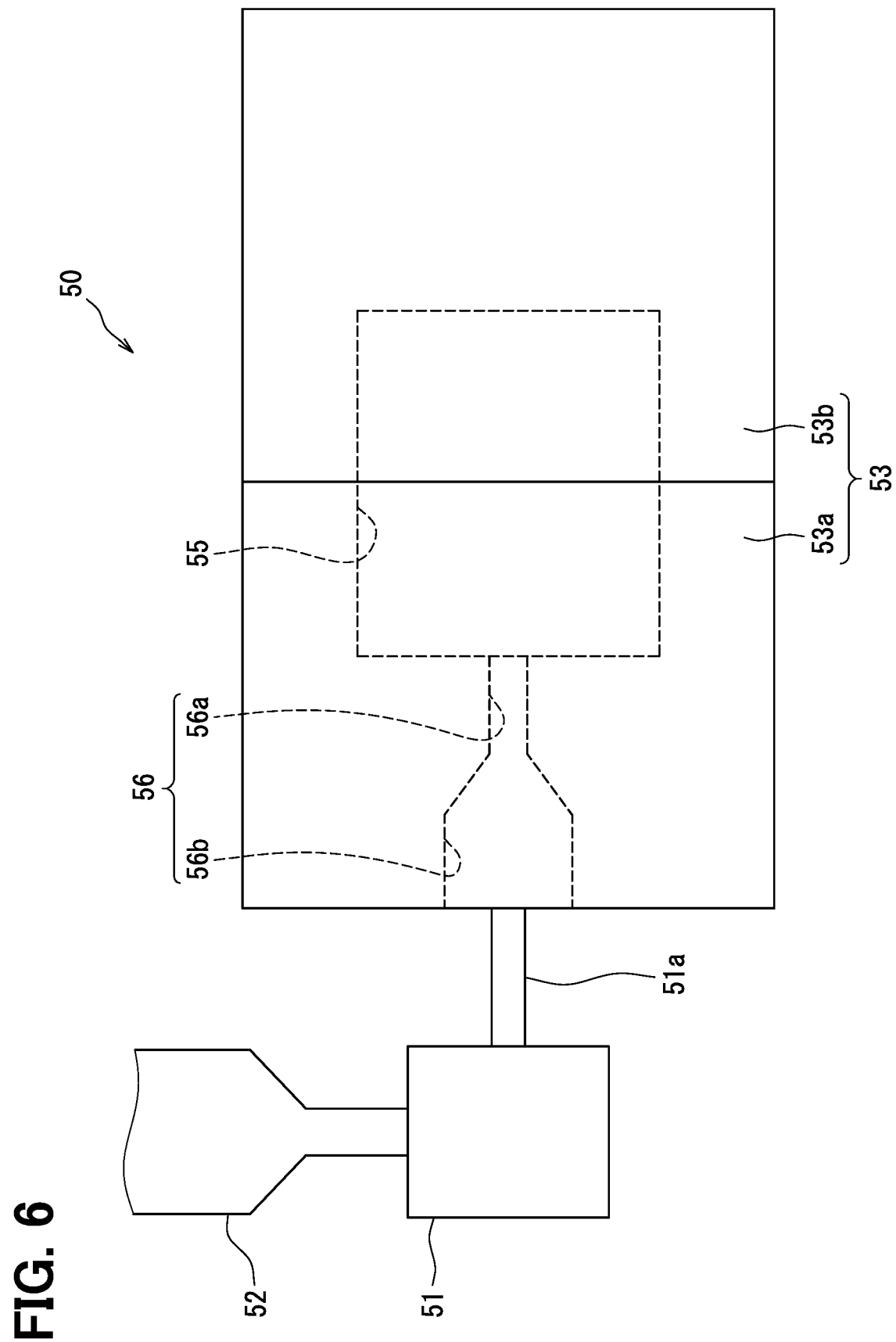
FIG. 6 is a schematic view illustrating a configuration of an injection molding apparatus.
Figure 7:
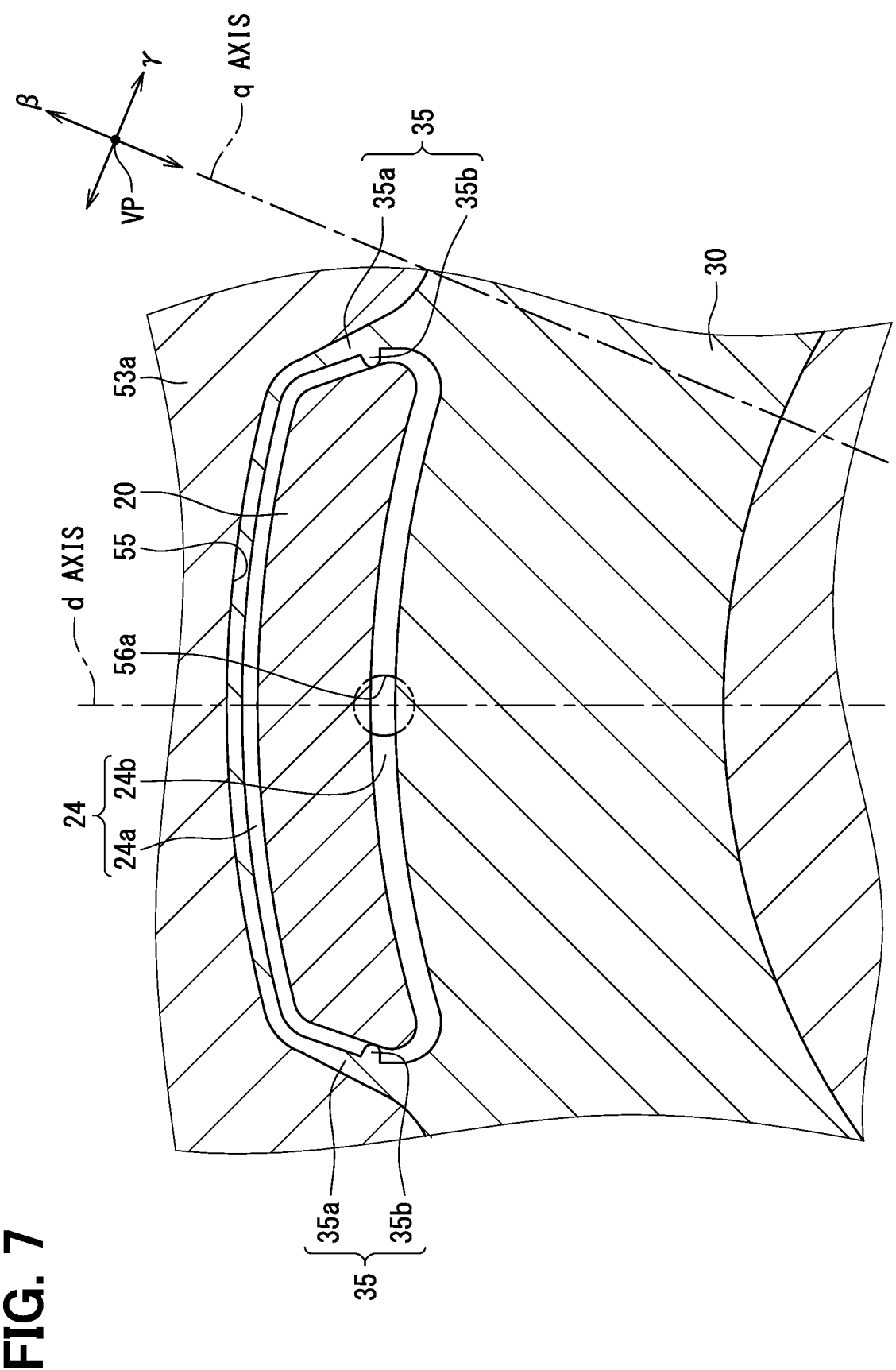
FIG. 7 is a diagram illustrating a positional relationship between a gate of a mold device and an inner gap of the rotor.

As shown in FIG. 6, the injection molding apparatus 50 includes an injection molding machine 51, a hopper 52, and a mold device 53. The hopper 52 supplies a solid resin material such as pellets into the injection molding machine 51. The injection molding machine 51 heats the solid resin material supplied from the hopper 52 to generate a molten resin and supplies the molten resin into the mold device 53. The injection molding machine 51 has a nozzle 51a and injects the molten resin into the mold device 53 through the nozzle 51a and the molten resin is pressed in the mold device 53.

The mold device 53 includes a mold. The mold device 53 defines a cavity 55 and a resin passage 56. Both the cavity 55 and the resin passage 56 are defined by an internal space of the mold device 53. The mold device 53 corresponds to a forming portion that forms the cavity 55 and the resin passage 56. The cavity 55 is a cavity for molding the filling portion 25 and a housing space for housing the rotor core 30 including the magnets 20. The resin passage 56 extends from the cavity 55 and corresponds to a connecting passage that fluidly connects between the nozzle 51a and the cavity 55 while the mold device 53 is attached to the injection molding machine 51.

The resin passage 56 includes gates 56a and a runner 56b. The gates 56a are located at a downstream end of the resin passage 56 near the cavity 55 and the runner 56b extends from the gates 56a toward the upstream side of the resin passage 56. The mold device 53 includes the multiple gates 56a.

The mold device 53 includes a first mold portion 53a and a second mold portion 53b. Each of the mold portions 53a and 53b has a recessed portion and the cavity 55 is defined by these recessed portions. One of the first mold portion 53a and the second mold portion 53b defines the gates 56a. In the present embodiment, the first mold portion 53a defines the gates 56a.

When the magnets 20 and the rotor core 30 are housed in the cavity 55, both ends of the housing hole 31 of the rotor core 30 are closed by an inner peripheral surface of the mold device 53. Even in this state, the gates 56a are in communication with the housing holes 31. As shown in FIG. 7, each of the gates 56a is arranged adjacent to the inner gap 24b of the housing hole 31 in the axial direction a to fluidly in communication with the inner gap 24b while not in communication with the outer gap 24a. The downstream end of each of the gates 56a is arranged on the d-axis. The gates 56a are provided for one ends of the housing holes 31 in the axial direction α.

When the molten resin is supplied from the injection molding machine 51 into the resin passage 56, the molten resin flows into the inner gaps 24b of the housing holes 31 through the gates 56a. The molten resin reaches the outer gaps 24a after passing through at least a portion of the inner gaps 24b in the housing hole 31. Specifically, the molten resin having flown into the inner gaps 24b through the gates 56a flows in the circumferential direction γ away from the gates 56a and further flows around the ends of the magnets 20 in the circumferential direction γ. Then, the molten resin passes through near the protrusions 35b and flows into the outer gaps 24a. This molten resin presses the magnets 20 radially outward. In this case, the molten resin presses the magnets 20 against the protrusions 35b. The molten resin is solidified while pressing the magnet against the protrusion 35b to form the filling portions 25, so that a state in which the magnets 20 are in contact with the protrusions 35b is maintained.

When the rotor 12 is manufactured, a step of preparing the mold device 53 and a step of preparing the rotor core 30 and the magnets 20 are performed. The step of preparing the rotor core 30 and the magnets 20 includes a step of manufacturing the rotor core 30 and a step of manufacturing the magnets 20. Then, a step of housing the magnets 20 in the housing holes 31 of the rotor core 30 is performed. After that, the mold device 53 is assembled by attaching the first mold portion 53a and the second mold portion 53b to the rotor core 30 such that the rotor core 30 including the magnets 20 is housed in the cavity 55.

Then, a step of attaching the mold device 53 to the injection molding machine 51 is performed and then a supply step of supplying the molten resin from the injection molding machine 51 to the mold device 53 is performed. In the supply step, the molten resin is injected into the inner gaps 24b of the housing gaps 24 of the housing holes 31 through the gates 56a. After the supply step, a step of solidifying the molten resin filled in the housing gaps 24 is performed. By performing this step, the filling portions 25 are formed by the molten resin and the rotor 12 including the filling portions 25 is formed. After that, the mold device 53 is removed from the rotor 12.

According to the present embodiment described so far, the pairs of supporters 35 hold the pairs of shoulders 22 of the magnets 20 from radially outsides of the magnets 20. In this configuration, when the rotor 12 rotates along with the operation of the rotating electric machine 10, the pairs of supporters 35 restrict the magnets 20 from moving radially outward due to centrifugal force. Therefore, the pairs of supporters 35 can suppress load of the magnets 20 due to centrifugal force from being applied to the covering portions 36 and restrict the covering portions 36 from being deformed.

Moreover, since the covering portions 36 of the rotor 12 cover the magnets 20 from radially outsides of the magnets 20, the covering portions 36 restrict the base portions 21 of the magnets 20 from being deformed to protrude radially outward. In particular, the filling portions 25 are filled in the outer gaps 24a of the housing holes 31. In this configuration, even if the magnets 20 are deformed by centrifugal force, the filling portions 25 in the outer gaps 24a regulate the magnets 20 from getting in contact with the covering portion 36 at a point. In this case, since the load applied from the magnets 20 to the covering portions 36 is dispersed over the entire of the covering portions 36 due to the filling portions 25, the load from the magnets 20 is restricted from being concentrated on a point of the covering portions 36. Thus, abnormalities such as deformation of the covering portions 36 can be restricted.

Further, since each of the covering portions 36 is thinner than each of the supporters 35, the magnetic flux is less likely to pass through the covering portions 36 in a direction that causes a polarity opposite to the polarity on the d-axis. That is, a short circuit of magnetic flux through the covering portions 36 is less likely to occur due to the thinning of the covering portions 36. Therefore, even if the thickness dimension D1 of the supporters 35 is sufficiently increased so that the strength of the supporters 35 can counter the centrifugal force, it is possible to prevent the magnetic flux from passing through the supporters 35 and reducing the useful flux. Further, since the magnets 20 are supported by the supporters 35, the covering portions 36 need to have strength high enough to restrict the magnet 20 from deforming. Therefore, the covering portions 36 can be sufficiently thinned so that the useful flux does not decrease.

As described above, it is possible to suppress both the occurrence of abnormalities such as deformation in the rotor core 30 and the magnets 20 and the reduction of the useful flux.

According to the present embodiment, the magnets 20 extend through the d-axis in the circumferential direction γ. In this configuration, the magnets 20 are provided on the d-axis at one magnetic pole. Comparing to a configuration in which the magnet 20 is not located on the d-axis at one magnetic pole, for example, the useful flux is less likely to decrease. On the other hand, a size of the magnet 20 becomes large and centrifugal force generated at the magnet 20 when the rotor 12 rotates becomes large. Therefore, abnormalities such as deformation of the magnet 20 and the rotor core 30 may occur. Therefore, as in the present embodiment, it is preferable that the magnets 20 extend through the d-axis in the circumferential direction γ while the supporters 35 and the covering portions 36 restrict the magnets 20 and the rotor core 30 from deforming. A configuration in which the magnet 20 is not provided on the d-axis at one magnetic pole may be a configuration in which two magnets are arranged in the circumferential direction γ with the d-axis sandwiched between the two magnets at one magnetic pole.

According to the present embodiment, since the thickness dimension D1 of the extending portion 35a of the supporter 35 is larger than the thickness dimension D2 of the covering portion 36, the strength of the supporters 35 can be increased. Moreover, since the protrusions 35b are located at the extending portions 35a, the protrusions 35b are more likely to hold the magnets 20 than the covering portions 36. Therefore, the load from the magnets 20 is likely to be applied to the supporters 35 instead of the covering portions 36.

According to the present embodiment, in the rotor core 30, the q-axis recessed portions 38 and the supporters 35 are arranged side by side in the radial direction β. In this configuration, unlike a configuration in which the q-axis recessed portions 38 and the extending portions 35a are not arranged in the radial direction β, the thickness dimension D1 of the extending portion 35a and the thickness dimension D7 of the q-axis crossing portion 34 can be defined depending on the recess dimension D6 and the shape of the q-axis recessed portion 38. In this case, the q-axis recessed portions 38 limit the extending portions 35a and the q-axis crossing portions 34 from becoming too thick. Thus, the magnetic flux is restricted from passing through the extending portions 35a and the q-axis crossing portions 34 in a direction that causes a polarity opposite to the polarity on the d-axis. Therefore, the q-axis recessed portions 38 can restrict useful flux from decreasing due to the supporters 35 and the q-axis crossing portions 34.

According to the present embodiment, the supporters 35 adjacent to each other in the circumferential direction γ through the q-axis are connected to each other by the q-axis crossing portion 34. In this configuration, since the q-axis crossing portion 34 is located radially outside of the inner core 32, the thickness of the supporter 35 can be shortened by a degree of the thickness of the q-axis crossing portion 34 compared to a configuration in which the supporter 35 extends from the inner core 32. Further, since it is not necessary to separate the extending portions 35a from adjacent ones in the circumferential direction γ through the q-axis, the thickness dimension D1 of the extending portions 35a can be increased. As described above, the strength of the supporters 35 can be increased utilizing the q-axis crossing portions 34.

According to the present embodiment, when the rotor 12 is not rotating, the magnets 20 are in contact with the supporters 35 while located radially inward away from the covering portions 36. Therefore, when the rotor 12 is rotating, it is possible to realize a configuration in which the load from the magnets 20 is more likely to be applied to the supporters 35 than the covering portions 36.

According to the present embodiment, the gap dimension D4 of the inner gap 24b in the housing hole 31 is larger than the gap dimension D5 of the outer gap 24a. In this configuration, in the process for manufacturing the rotor 12, when the housing gaps 24 are filled with the molten resin to form the filling portions 25, the molten resin is more likely to flow into the inner gaps 24b than the outer gaps 24a. When the molten resin flows positively into the inner gaps 24b in this way, the magnets 20 are pressed outward by the molten resin and likely to be caught by the supporters 35. Therefore, it is possible to realize a configuration in which the load from the magnets 20 is more likely to be applied to the supporters 35 than to the covering portions 36.

According to the present embodiment, since the entire of the covering portions 36 serve as a thin portion, the magnetic flux is less likely to pass through the covering portions 36 in the circumferential direction γ. That is, the covering portions 36 are entirely thinned, thereby surely suppressing a short circuit of the magnetic flux through the covering portions 36.

According to the present embodiment, in the process for manufacturing the rotor 12, the molten resin forming the filling portions 25 is supplied through the gates 56a of the mold device 53 into the inner gap 24b of the rotor core 30. Therefore, by simply injecting the molten resin into the housing gaps 24 of the housing holes 31, the magnets 20 are moved radially outward away from the inner core 32 in the housing holes 31 and the pairs of shoulders 22 of the magnets 20 can hold the pairs of protrusions 35b. As a result, it is possible to realize a configuration in which the load from the magnets 20 is less likely to be applied to the covering portions 36, so that the covering portions 36 can be as thin as possible. The covering portions 36 are not necessarily thinner than the supporters 35.

Second Embodiment

In the first embodiment, the protrusion 35b of the supporter 35 and the shoulder 22 of the magnet 20 are in line contact with each other. In the second embodiment, the protrusion 35b and the shoulder 22 are in surface contact with each other. In the present embodiment, differences from the first embodiment will be mainly described.

Figure 8:
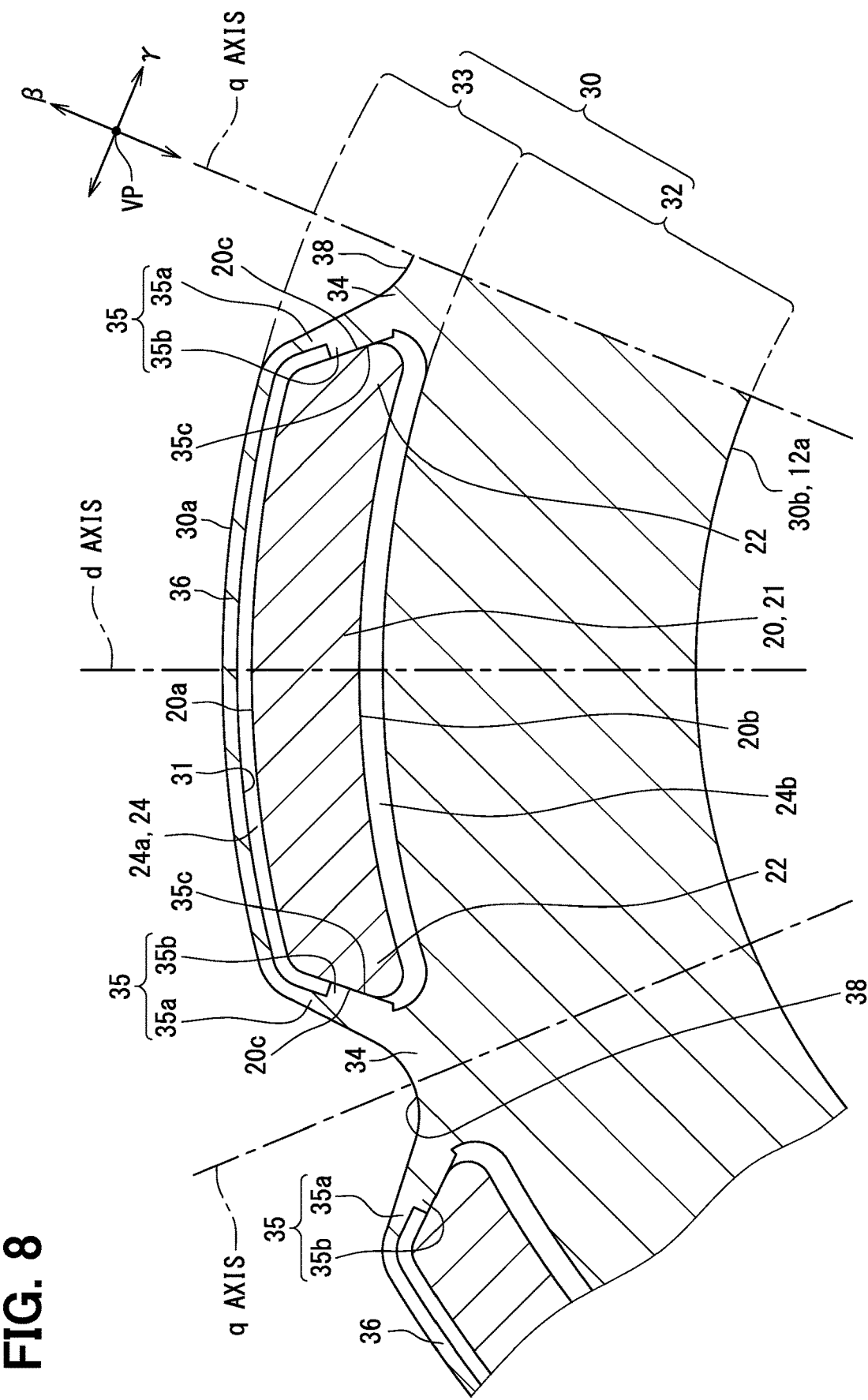
FIG. 8 is an enlarged view of a rotor of a second embodiment around a magnet.

As shown in FIG. 8, a cross-sectional shape of the protrusion 35b taken along a surface extending in the directions β and γ that are perpendicular to the axial direction α is rectangular. In each of the supporters 35, the protrusion 35b includes a distal end surface 35c that extends in an extending direction of the extending portion 35a. The distal end surface 35c is a surface extending in the axial direction α and both directions β and γ that are perpendicular to the axial direction α. The distal end surface 35c and the side surface 20c of the magnet 20 include portions extending in parallel with each other and the portions are in surface contact with each other at least a portion. When the protrusion 35b comes in contact with the shoulder 22 of the magnet 20 from radially outside of the magnet 20, the distal end surface 35c of the protrusion 35b and the side surface 20c of the magnet 20 are in surface contact with each other.

According to the present embodiment, when the supporters 35 hold the magnets 20, the protrusion 35b of each of the supporters 35 and the shoulder 22 of each of the magnets 20 come into surface contact with each other. In this configuration, the stress applied to the magnets 20 from the supporters 35 when the rotor 12 rotates is likely to disperse over entire portions of the magnets 20 that are in surface contact with the supporters 35. Therefore, it is possible to prevent the stress from being concentrated on a portion of the magnets 20 and causing abnormalities such as deformation of the magnets 20. In other words, when the magnets 20 are pressed against the protrusions 35b of the supporters 35 by the centrifugal force generated when the rotor 12 rotates, the load from the magnets 20 is dispersed over the entire portions of the protrusions 35b that are in surface contact with the magnets 20. Therefore, the load from the magnets 20 is restricted from being concentrated on a portion of the protrusions 35b. Thus, abnormalities such as deformation of the protrusion 35b and deformation of a portion of the extending portions 35a supporting the protrusions 35b can be restricted from occurring in the supporter 35.

Third Embodiment

In the first embodiment, the protrusions 35b of the supporters 35 hold the magnets 20, but in the third embodiment, the extending portions 35a of the supporters 35 hold the magnets 20. In the present embodiment, differences from the first embodiment will be mainly described.

Figure 9:
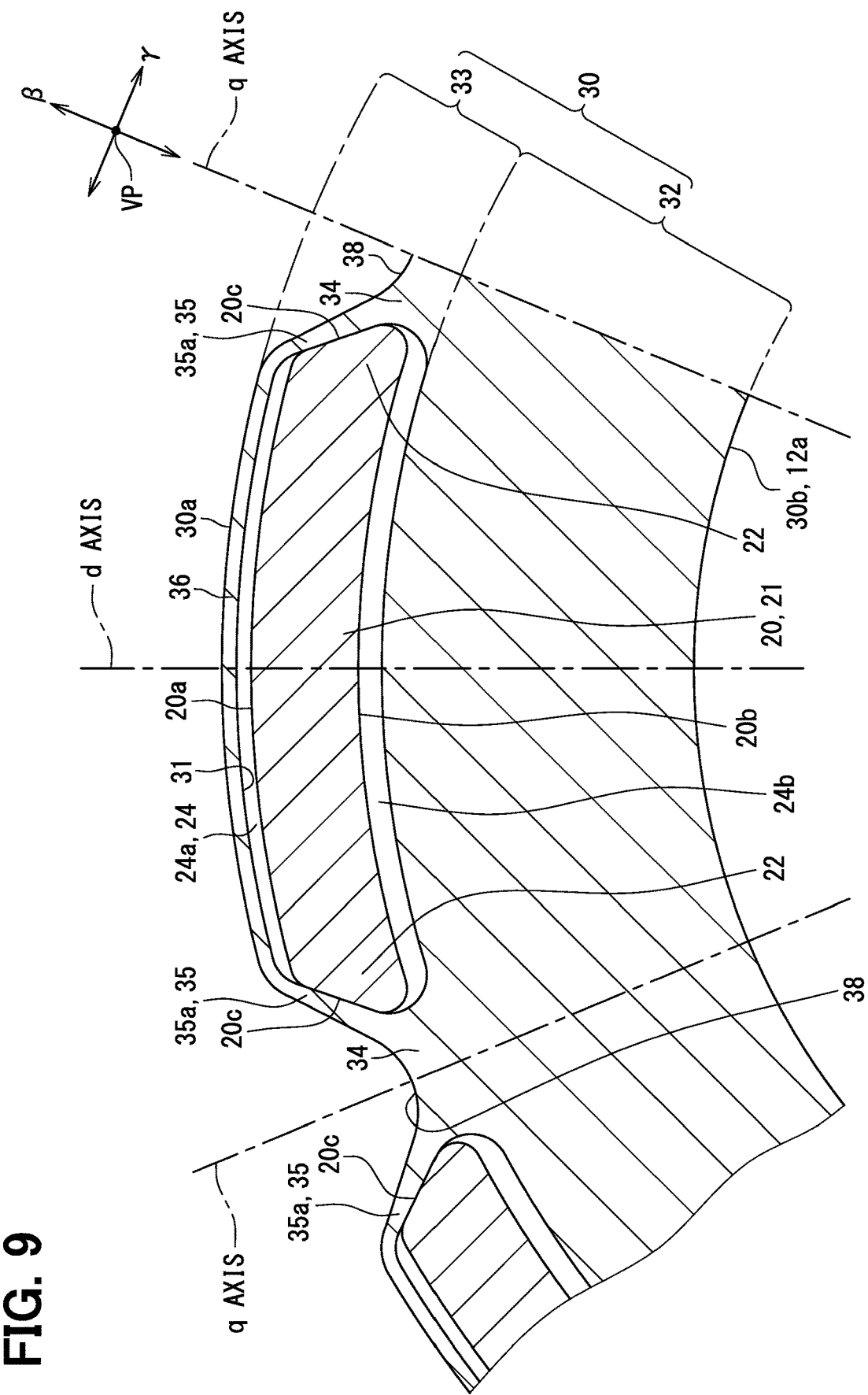
FIG. 9 is an enlarged view of a rotor of a third embodiment around a magnet.

As shown in FIG. 9, unlike the first embodiment, each of the supporters 35 does not include the protrusion 35b. That is, the extending portion 35a is not provided with the protrusion 35b. In this configuration, each of the inner surface of the extending portion 35a includes at least a portion extending in parallel with a portion of the side surface 20c of the magnet 20. The portions extending in parallel are in surface contact with each other. When the extending portion 35a holds the shoulder 22 of the magnet 20 from radially outside of the magnet 20, the inner surface of the extending portion 35a and the side surface 20c of the magnet 20 are in surface contact with each other.

According to the present embodiment, when the supporter 35 holds the magnet 20, the extending portion 35a of the supporter 35 and the shoulder 22 of the magnet 20 are in surface contact with each other. With this configuration, the same advantages as those of the second embodiment can be obtained. In particular, when the magnet 20 is pressed against the extending portion 35a of the supporter 35 by the centrifugal force generated when the rotor 12 rotates, the load from the magnet 20 is likely to disperse over an area of the extending portion 35a that is in surface contact with the magnet 20. Therefore, it is possible to restrict the load from the magnet 20 from being concentrated on a portion of the extending portion 35a and causing abnormalities of the supporters 35 such as deformation of the extending portions 35a.

Fourth Embodiment

In the rotor 12 of the first embodiment, one magnet 20 is provided for one magnetic pole, but in the fourth embodiment, multiple magnets 20 are provided for one magnetic pole. In the present embodiment, differences from the first embodiment will be mainly described.

Figure 10:
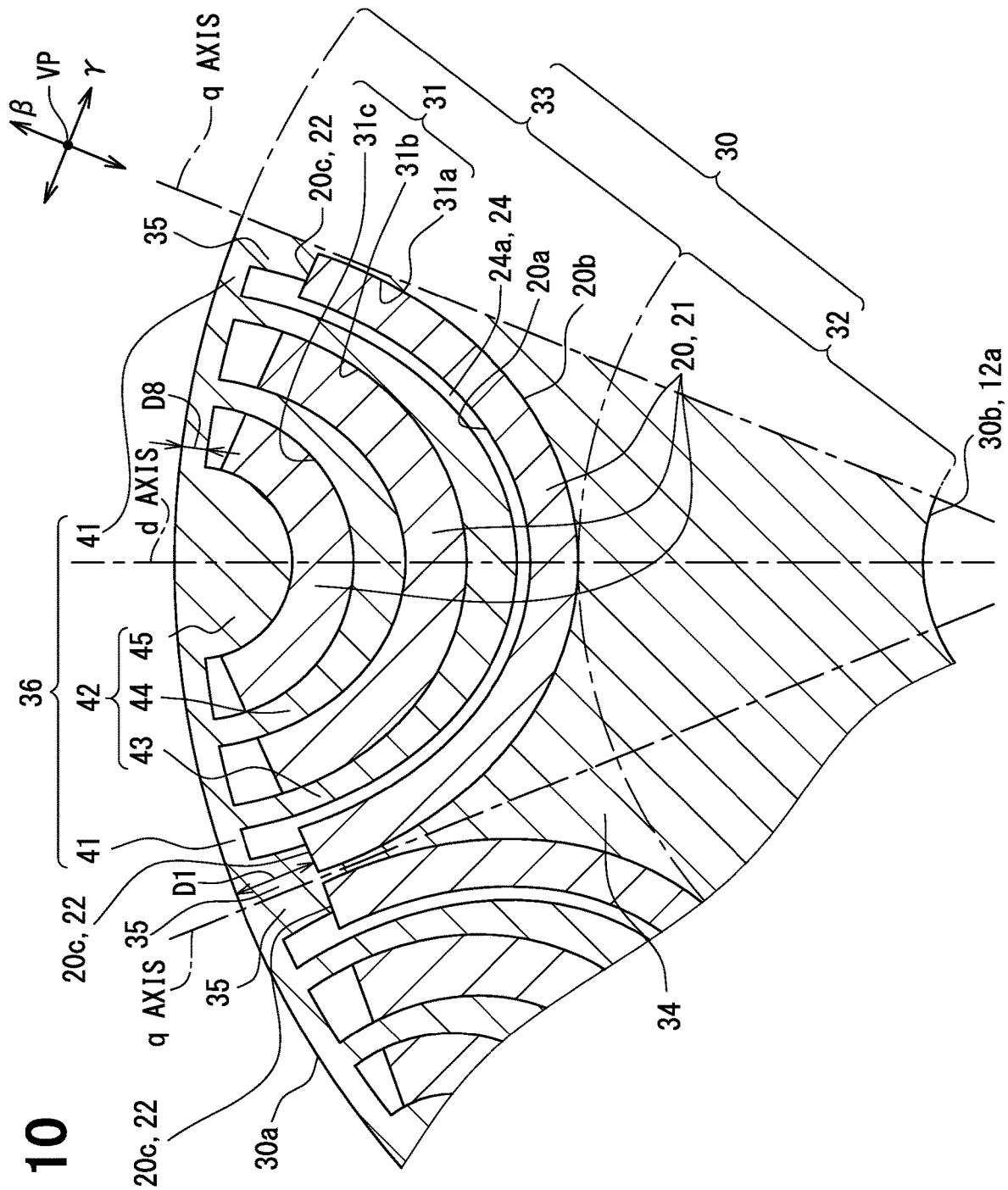
FIG. 10 is an enlarged view of a rotor of a fourth embodiment around a magnet.

As shown in FIG. 10, multiple magnets 20 are arranged in the radial direction β at one magnetic pole. In this embodiment, three magnets 20 are arranged for one magnetic pole. The magnets 20 extend through the d-axis in the circumferential direction γ, as in the first embodiment. In the rotor 12, each of the magnets 20 is embedded in a U-shape. Specifically, a cross-sectional shape of each of the magnets 20 taken along a surface extending in the directions β and γ that are perpendicular to the axial direction α is curved so that a central portion of the magnet 20 in the circumferential direction γ protrudes radially inward. In the magnet 20, the outer surface 20a is located inside of the curve and the inner surface 20b is arranged outside of the curve. Further, a pair of side surfaces 20c are located between the outer surface 20a and the inner surface 20b in the circumferential direction γ and face radially outward. Similar to the first embodiment, in each of the magnets 20, the base portion 21 includes at least the outer surface 20a and the inner surface 20b, and the shoulders 22 includes at least the side surfaces 20c.

The rotor core 30 includes housing holes 31a to 31c. Each of the housing holes 31a to 31c houses each of the magnets 20. Multiple pairs of the housing holes 31a to 31c are arranged in the circumferential direction γ, and one pair of the housing holes 31a to 31c is provided for one magnetic pole. In the pair of the housing holes 31a to 31c, a first housing hole 31a is defined in the innermost side portion of the rotor core 20 in the radial direction and a third housing hole 31c is defined in the outermost side portion of the rotor core 20 in the radial direction. A second housing hole 31b is defined between the first housing hole 31a and the third housing hole 31c in the radial direction β. Similar to the housing holes 31 of the first embodiment, each of the housing holes 31a to 31c defines a housing gap 24 between the rotor core 30 and the magnet 20 and a filling portion is filled in the housing gap 24.

Each of the housing holes 31a to 31c has substantially the same shape as that of the magnet 20. Specifically, each of the housing holes 31a to 31c is curved so that a central portion of the each of the housing holes 31a to 31c in the circumferential direction γ protrudes radially inward. The first housing hole 31a is the largest and the third housing hole 31c is the smallest in both the radial direction β and the circumferential direction γ. The second housing hole 31b is defined on an inner side of the first housing hole 31a and the third housing hole 31c is defined on an inner side of the second housing hole 31b.

In the magnetic poles adjacent to each other in the circumferential direction γ with the q-axis in between, the first housing holes 31a of the adjacent magnetic poles are adjacent to each other in the circumferential direction γ with the q-axis in between. The q-axis crossing portion 34 is located radially outside of the inner core 32 between the first housing holes 31a adjacent each other in the circumferential direction γ. In addition, the q-axis crossing portion 34 is defined between the supporters 35 adjacent to each other in the circumferential direction γ with the q-axis in between. The supporters 35 are located between the q-axis crossing portion 34 and the d axis in the circumferential direction γ and the covering portion 36 is located between the d-axis and the supporter 35. The q-axis crossing portions 34, the supporters 35, and the covering portions 36 form the outer circumferential surface 30a of the rotor core 30.

The supporter 35 extends from the q-axis crossing portion 34 toward the d-axis and the covering portion 36 extends from the supporter 35 toward the d-axis. In this case, extending directions of the supporter 35 and the covering portion 36 are the circumferential direction γ and the thickness direction is the radial direction β. Unlike the first embodiment, the supporter 35 does not include the protrusion 35b. Therefore, the entire of the supporter 35 is the extending portion 35a of the first embodiment.

The covering portion 36 has a thin portion 41 and a protruding portion 42. The thin portion 41 extends from the supporters 35 toward the d-axis in the circumferential direction γ and is thinner than the supporters 35. The thickness dimension D8 of the thin portion 41 in the radial direction β is less than the thickness dimension D1 of the supporter 35. The thickness dimension D8 is defined as a thickness dimension of the thickest portion of the thin portion 41 and the thickness dimension D1 of the supporter 35 is defined as a thickness dimension of the thinnest portion of the supporter 35. The thin portion 41 has a length dimension in the circumferential direction γ that is larger than the thickness dimension D8 of the thin portion 41. The length dimension of the thin portion 41 may be less than the thickness dimension D8, but it is preferable that the length dimension be set to a value large enough to restrict the magnetic flux from passing through the thin portion 41 in the circumferential direction γ.

The pair of thin portions 41 are provided with the d-axis in between. The protruding portion 42 extends to connect between the thin portions 41 and protrudes from the outer circumferential surface 30a of the rotor core 30 radially inward as a whole. The protruding portion 42 includes a first protruding portion 43, a second protruding portion 44, and a third protruding portion 45. The first protruding portion 43 is located between the first housing hole 31a and the second housing hole 31b to partition off the first housing hole 31a from the second housing hole 31b. The second protruding portion 44 is located between the second housing hole 31b and the third housing hole 31c to partition off the housing holes 31b and 31c from each other. The third protruding portion 45 is located radially outside of the third housing hole 31c and forms the outer circumferential surface 30a of the rotor core 30.

In the first housing hole 31a, a housing gap 24 is defined between the magnet 20, the thin portion 41, and the first protruding portion 43. The housing gap 24 particularly includes an outer gap 24a defined between the magnet 20 and the first protruding portion 43. In the first housing hole 31a, the side surfaces 20c of the magnet 20 are in contact with the supporters 35. Even if the side surfaces 20c of the magnet 20 are not in contact with the supporters 35, a distance between each of the side surfaces 20c and each of the supporters 35 in the radial direction β is smaller than a distance between each of the side surfaces 20c and the thin portion 41.

According to the present embodiment, even if centrifugal force is generated in the magnet 20 due to the rotation of the rotor 12, the shoulders 22 of the magnet 20 are caught by the supporters 35 in the first housing hole 31a, so that the pair of supporters 35 restrict the magnet 20 from moving in the radial direction. Thus, in the first housing hole 31a, the load from the magnet 20 is restricted from being applied to the thin portion 41 and the first protruding portion 43, thereby restricting the covering portions 36 from having abnormalities such as deformation. Moreover, in the first housing hole 31a, since the magnets 20 are covered by the protruding portions 42 from radially outsides of the magnets 20, so that the protruding portions 42 can restrict the magnets 20 from deforming by centrifugal force.

Further, since the thin portion 41 of the covering portion 36 is thinner than each of the supporters 35, the magnetic flux is less likely to pass through the thin portion 41 in a direction that causes a polarity opposite to the polarity at the d-axis. That is, the thin portion 41 restricts a short circuit of magnetic flux through the covering portion 36 from generating. Further, in the first housing hole 31a, the magnet 20 is supported by the supporters 35. Thus, the thin portion 41 needs to have a strength high enough to support the magnets 20 in the housing holes 31b and 31c and the protruding portion 42. Therefore, the thin portion 41 can be sufficiently thinned so that the useful magnetic flux is not reduced.

Other Embodiments

The disclosure in the present specification is not limited to the illustrated embodiments. The disclosure encompasses the illustrated embodiments and variations thereof by those skilled in the art. For example, the disclosure is not limited to the combinations of components and elements shown in the embodiments, and various modifications and implementations can be performed. The disclosure may be implemented in various combinations. The disclosure may have additional portions that may be added to the embodiments. The disclosure encompasses the omission of parts and elements of the embodiments. The disclosure encompasses the replacement or combination of components, elements between one embodiment and another. The disclosed technical scope is not limited to the description of the embodiment. Technical scopes disclosed are indicated by descriptions in the claims and should be understood to include all modifications within the meaning and scope equivalent to the descriptions in the claims.

As a first modification, each of the supporters 35 may have multiple protrusions 35b. For example, the multiple protrusions 35b may be arranged in the extending direction of the extending portion 35a or in the axial direction α.

As a second modification, the extending portion 35a may be extend either in the radial direction β or in the circumferential direction γ while the protrusion 35b is located to hold the shoulders 22 of the magnet 20 from radially outside of the magnet 20.

As a third modification, each of the shoulders 22 of the magnet 20 may have a protrusion protruding toward the supporter 35. Even in this case, it is possible to realize a configuration in which the supporters 35 easily hold the shoulders 22 of the magnet 20 from radially outside of the magnet 20.

As a fourth modification 4, in the housing hole 31, the gap dimension D4 of the inner gap 24b is not necessarily larger than the gap dimension D5 of the outer gap 24a. Further, when the rotor 12 is not rotating, the magnet 20 may be in contact with at least one of the inner core 32 and the covering portion 36 without being separated from them in the housing hole 31. Even in this case, the outer gap 24a or the inner gap 24b may be defined between the magnet 20 and the rotor core 30.

As a fifth modification 5, in the housing hole 31, at least one of the outer gap 24a and the inner gap 24b may be filled with the filling portion 25. Further, the housing gaps 24 may not be filled with the filling portions 25.

As a sixth modification 6, the end of the q-axis recessed portion 38 in the circumferential direction γ, the supporter 35, the housing hole 31, and the magnet 20 may not be aligned in the radial direction β in one magnetic pole. For example, the inner surface of the q-axis recessed portion 38 may extend in the radial direction β, or the width dimension of the q-axis recessed portion 38 in the circumferential direction γ may be smaller than a distance between the housing holes 31 adjacent to each other. In these configurations, the q-axis recessed portion 38, the supporter 35, the housing hole 31, and the magnet 20 are located side by side in the circumferential direction γ.

As a seventh modification 7, the thickness dimension D7 of the q-axis crossing portion 34 may be larger than the recessed dimension D6 of the q-axis recessed portion 38. For example, the rotor core 30 is not necessarily provided with the q-axis recessed portion 38. In this configuration, the thickness dimension D7 of the q-axis crossing portion 34 is the same as the thickness dimension of the outer core 33 in the radial direction β.

As an eighth modification, the rotor core 30 does not necessarily include the q-axis crossing portion 34. For example, the recessed dimension D6 in the radial direction β of the q-axis recessed portion 38 is equal to or larger than the thickness dimension of the outer core 33. In this configuration, the supporters 35 extend radially outward from the inner core 32 instead of the q-axis crossing portion 34.

As a ninth modification, the magnet 20 may be embedded in a block shape or split shape in the rotor 12. For example, in the block shape, magnets are embedded in the rotor core 30 such that the magnets extend straight in a direction perpendicular to the d-axis at one magnetic pole. In the split shape, magnets are embedded in the rotor core 30 such that two of the magnets are arranged in the circumferential direction γ while the d-axis is sandwiched between the two magnets at one magnetic pole. In this configuration, at one magnetic pole, a pair of supporters 35 configured to hold the pair of shoulders of the magnet 20 are located between the d-axis and the q-axis.

As a tenth modification 10, in the fourth embodiment, the multiple housing holes 31a to 31c are not necessarily defined at one magnetic pole but one housing hole may be defined at the one magnetic pole. With this configuration, it is possible to realize a configuration in which one magnet 20 housed in one housing hole is supported by the supporters 35. In this configuration, it is possible to avoid applying the load from the magnets 20 housed in the second housing hole 31b and the third housing hole 31c to the thin portion 41 of the covering portion 36.

As an eleventh modification 11, when the mold device 53 is attached to the rotor core 30 including the magnets 20, the gates 56a may be provided at both ends in the axial direction α of each of the housing holes 31. In this case, the molten resin is injected through the gates 56a into the both ends of the housing hole 31. Further, the downstream ends of the gates 56a may not be arranged on the d-axis, but may be arranged at a position offset from the d-axis in the circumferential direction γ. Further, the gates 56a may be arranged to be in communication with the outer gap 24a of the housing gap 24. When the molten resin is injected through the gates 56a into the outer gap 24a, it is considered that the shoulders 22 of the magnets 20 are likely to move radially inward away from the supporters 35. Even in this case, the shoulders 22 of the magnet 20 are caught by the supporters 35 as the rotor 12 rotates and the shoulders 22 of the magnets 20 are supported by the supporters 35.

What is claimed is:

1. A rotor comprising:
   a magnet including a pair of shoulders;
   a rotor core defining a housing hole configured to house the magnet such that the pair of shoulders are arranged in a circumferential direction of the rotor, wherein
   the rotor core includes:
     an inner core located radially inward of the housing hole;
     a pair of supporters located radially outward of the inner core and arranged in the circumferential direction with the housing hole defined between the pair of supporters, the pair of supporters being configured to support the magnet by holding the pair of shoulders of the magnet from radially outsides of the pair of shoulders; and
     a covering portion configured to connect between the pair of supporters and cover the magnet from radially outside of the magnet,
   a thickness dimension of the covering portion is smaller than a thickness dimension of each of the pair of supporters,
   the covering portion is connected to at least the pair of supporters,
   the magnet is one of a plurality of magnets,
   a q-axis is defined by an axis passing through a midpoint of adjacent magnetic poles arranged in the circumferential direction and generated by the plurality of magnets,
   the rotor core includes a q-axis recessed portion recessed radially inward from an outer surface of the rotor core relative to a radial direction of the rotor that is parallel to the q-axis,
   one of the pair of supporters and the q-axis recessed portion are arranged radially adjacent relative to the radial direction,
   the housing hole is one of a plurality of housing holes,
   the pair of supporters is one of a plurality of pairs of supporters,
   the rotor core includes a connecting portion located between adjacent ones of the plurality of housing holes arranged in the circumferential direction,
   each of the connecting portions connects between one of the pair of supporters and one of another pair of supporters that is adjacent to the one of the pair of supporters in the circumferential direction without passing through the magnet, and the q-axis recessed portion has a recessed dimension that is larger than a thickness dimension of the connecting portion in the radial direction.

2. The rotor according to claim 1, wherein
the magnet extends in the circumferential direction over a d-axis that passes through a center of a magnetic pole and that extends in a radial direction.

3. The rotor according to claim 1, wherein
each of the pair of supporters includes:
- a thick portion thicker than the covering portion; and
- a protrusion protruding from the thick portion toward the magnet to be in contact with one of the pair of shoulders of the magnet from radially outside of the one of the pair of shoulders.

4. The rotor according to claim 3, wherein
the protrusion includes a distal end surface that extends both in an axial direction of the rotor core and in a direction perpendicular to the axial direction, and
the distal end surface is in surface contact with the one of the pair of shoulders.

5. The rotor according to claim 1, wherein
the magnet is in contact with the pair of supporters and distanced radially inward away from the covering portion.

6. The rotor according to claim 1, wherein
the magnet and the inner core define an inner gap therebetween in a radial direction,
the magnet and the covering portion define an outer gap therebetween in the radial direction, and
the inner gap is greater than the outer gap.

7. The rotor according to claim 1, wherein a first part of each supporter has a thickness dimension that is larger than the thickness dimension of the covering portion and smaller than the thickness dimension of the connection portion.

8. The rotor according to claim 1, wherein the one of the pair of supporters is arranged entirely radially outward of the q-axis recessed portion.

9. A method for manufacturing the rotor according to claim 1, the method comprising:
preparing the magnet that includes the pair of shoulders;
preparing the rotor core that defines the housing hole configured to house the magnet:
positioning the magnet in the housing hole such that the pair of shoulders are arranged in the circumferential direction;
preparing a mold device that includes:
- a cavity configured to mold a resin disposed in a housing gap between the magnet and the rotor core in the housing hole; and
- a gate connected to the cavity;
attaching the rotor core that includes the magnet in the housing hole to the cavity such that the gate is in communication with an inner gap of the housing hole in an axial direction of the rotor core, the inner gap being a gap defined between the magnet and the inner core;
supplying a molten resin into the inner gap through the gate; and
removing the mold device from the rotor core after the molten resin is solidified.

* * * * *